US012304222B2

(12) United States Patent
Taruya et al.

(10) Patent No.: US 12,304,222 B2
(45) Date of Patent: May 20, 2025

(54) TAPE CARTRIDGE, TAPE ROLL, AND TAPE CARTRIDGE SET

(71) Applicant: SEIKO EPSON CORPORATION, Tokyo (JP)

(72) Inventors: Keisuke Taruya, Shiojiri (JP); Taishi Sasaki, Matsumoto (JP); Akio Ishimoto, Shiojiri (JP); Hirosuke Yasuki, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 183 days.

(21) Appl. No.: 18/180,197

(22) Filed: Mar. 8, 2023

(65) Prior Publication Data

US 2023/0294417 A1 Sep. 21, 2023

(30) Foreign Application Priority Data

Mar. 9, 2022 (JP) ................................ 2022-036628
Sep. 26, 2022 (JP) ................................ 2022-153011

(51) Int. Cl.
*B41J 2/325* (2006.01)
*B41J 32/00* (2006.01)

(52) U.S. Cl.
CPC .............. *B41J 2/325* (2013.01); *B41J 32/00* (2013.01)

(58) Field of Classification Search
CPC .................................. B41J 2/325; B41J 32/00
See application file for complete search history.

(56) References Cited

U.S. PATENT DOCUMENTS

| | | | | |
|---|---|---|---|---|
| 2007/0264071 | A1 | 11/2007 | Takahashi | |
| 2014/0037359 | A1 | 2/2014 | Nakajima et al. | |
| 2020/0398595 | A1* | 12/2020 | Yanagisawa | B41J 15/044 |
| 2022/0118783 | A1 | 4/2022 | Ishimoto et al. | |

FOREIGN PATENT DOCUMENTS

| | | | |
|---|---|---|---|
| JP | 2001-114456 | A | 4/2001 |
| JP | 2007-301872 | A | 11/2007 |
| JP | 2019-142063 | A | 8/2019 |
| JP | 2020-104329 | A | 7/2020 |

* cited by examiner

*Primary Examiner* — Lisa Solomon
(74) *Attorney, Agent, or Firm* — Oliff PLC

(57) ABSTRACT

There is provided a tape cartridge including: a tape roll including a tape and a tape core which is provided with a core hole and around which the tape is wound; and a cartridge case accommodating the tape roll, and including a first case portion having a first base wall portion and a first core projection protruding from the first base wall portion in a first direction, and a third case portion having a third base wall portion and a third core projection protruding from the third base wall portion in a third direction opposite to the first direction and inserted into the core hole, in which the tape core is provided with an insertion receiving section which is positioned on a radially outer side of the tape core with respect to the core hole and into which the first core projection is inserted.

7 Claims, 14 Drawing Sheets

TAPE CARTRIDGE, TAPE ROLL, AND TAPE CARTRIDGE SET

The present application is based on, and claims priority from JP Application Serial Number 2022-153011, filed Sep. 26, 2022 and JP Application Serial Number 2022-036628, filed Mar. 9, 2022, the disclosures of which are hereby incorporated by reference herein in their entirety.

BACKGROUND

1. Technical Field

The present disclosure relates to a tape cartridge, a tape roll, and a tape cartridge set.

2. Related Art

In the related art, as disclosed in JP-A-2019-142063, a tape cartridge including a recording medium including a heat-sensitive tape and a paper tube, and a medium adapter accommodating the recording medium is known. The medium adapter includes an adapter main body and an adapter lid that is openably and closably attached to the adapter main body.

Further, as disclosed in JP-A-2007-301872, a tape cartridge including a printing tape and a cartridge case is known. The cartridge case includes a first case and a second case bonded to each other, and is configured to be disassembled into the first case and the second case by a disassembling device.

In the tape cartridge of the related art, for example, when the user replaces the recording medium, the rotation axis of the recording medium is inclined, and there is a problem that the rotation of the recording medium and the travelability of the heat-sensitive tape become unstable.

SUMMARY

According to an aspect of the present disclosure, there is provided a tape cartridge including: a tape roll including a tape and a tape core which is provided with a core hole and around which the tape is wound; and a cartridge case accommodating the tape roll, and including a first case portion having a first base wall portion and a first core projection protruding from the first base wall portion in a first direction, and a third case portion having a third base wall portion and a third core projection protruding from the third base wall portion in a third direction opposite to the first direction and inserted into the core hole, in which the tape core is provided with an insertion receiving section which is positioned on a radially outer side of the tape core with respect to the core hole and into which the first core projection is inserted.

According to another aspect of the present disclosure, there is provided a tape roll configured to be accommodated in a cartridge case including a first case portion having a first base wall portion and a first core projection protruding from the first base wall portion in a first direction, and a third case portion having a third base wall portion and a third core projection protruding from the third base wall portion in a third direction opposite to the first direction, the tape roll including: a tape; and a tape core provided with a core hole into which the third core projection is inserted, and around which the tape is wound, in which the tape core is provided with an insertion receiving section which is positioned on a radially outer side of the tape core with respect to the core hole and into which the first core projection is configured to be inserted.

According to still another aspect of the present disclosure, there is provided a tape cartridge set including: a plurality of tape rolls including a tape and a tape core which is provided with a core hole and around which the tape is wound; and a cartridge case configured to accommodate one tape roll of the plurality of tape rolls, and including a first case portion having a first base wall portion and a first core projection protruding from the first base wall portion in a first direction, and a third case portion having a third base wall portion and a third core projection protruding from the third base wall portion in a third direction opposite to the first direction and inserted into the core hole, in which the tape core is provided with an insertion receiving section which is positioned on a radially outer side of the tape core with respect to the core hole and into which the first core projection is inserted.

DESCRIPTION OF EXEMPLARY EMBODIMENTS

Hereinafter, a tape cartridge 101, which is an embodiment of a tape cartridge, will be described with reference to the accompanying drawings. The tape cartridge 101 is detachably mounted on the tape printing apparatus 1. In the following, directions based on the XYZ orthogonal coordinate system illustrated in each drawing will be described. However, these directions are for convenience of explanation only and do not limit the following embodiments in any way. In addition, the number of each component is merely an example, and the following embodiments are not limited in any way.

Tape Cartridge

Figure 1:
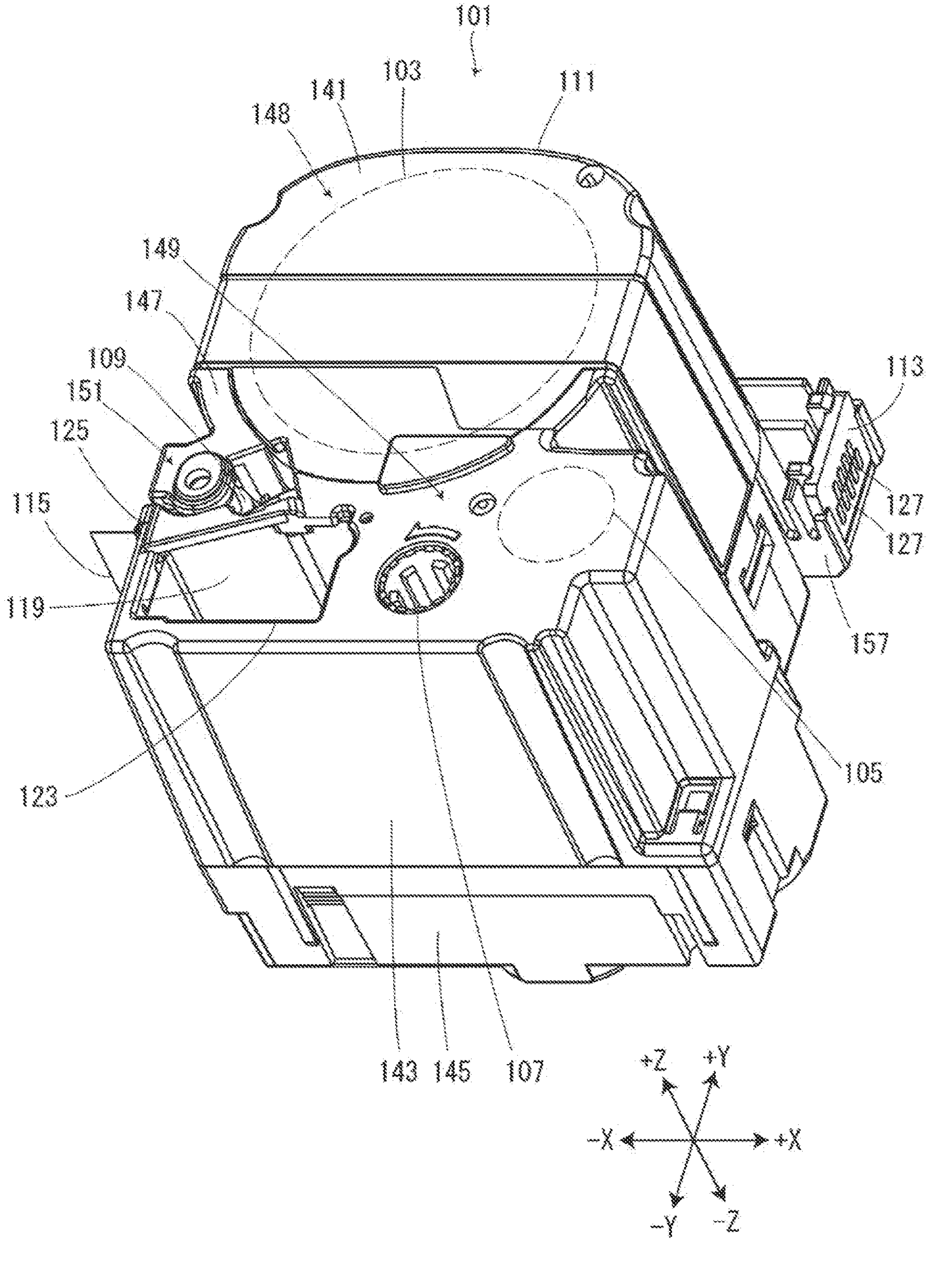
FIG. 1 is a perspective view of a tape cartridge.
Figure 2:
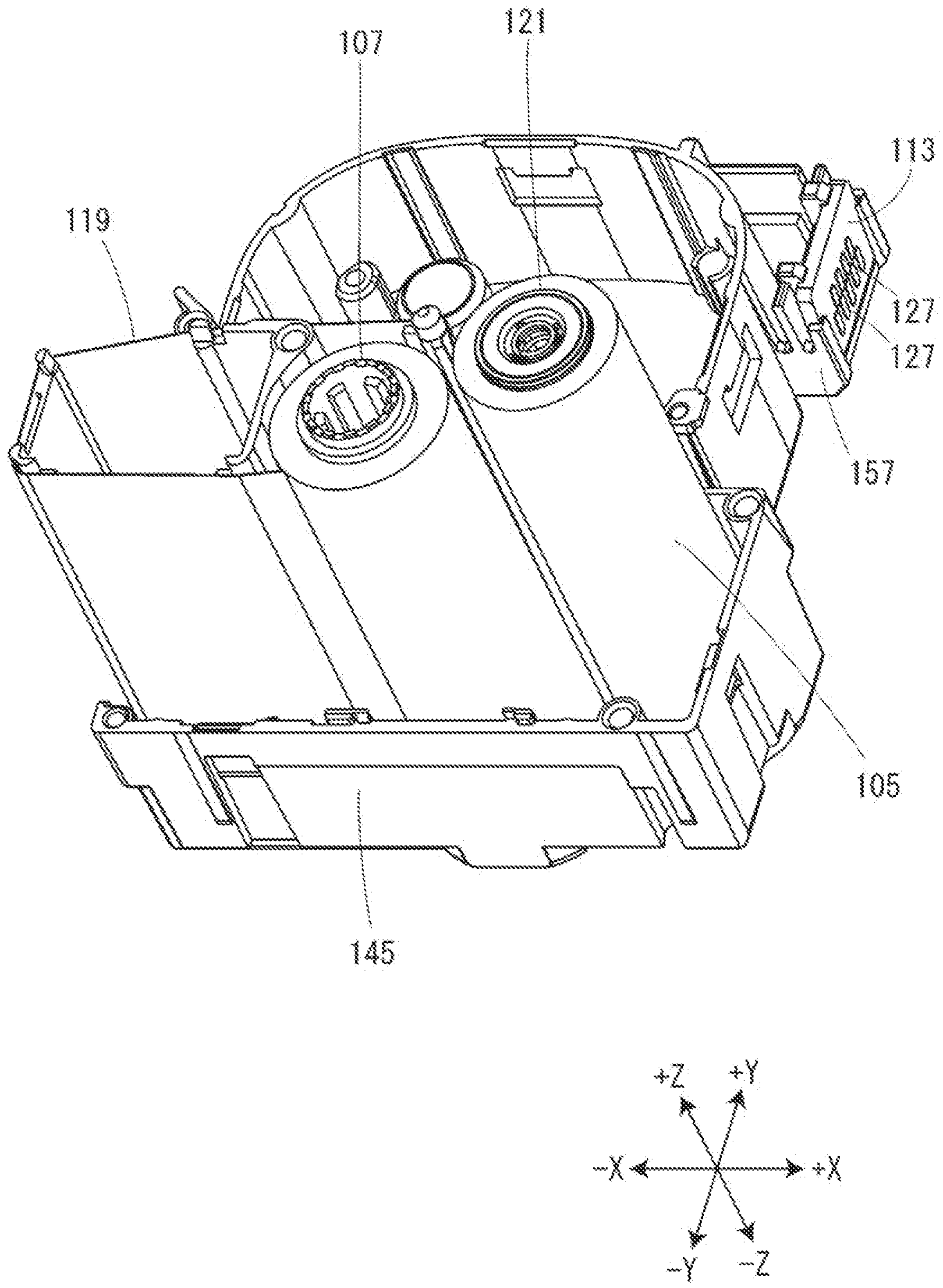
FIG. 2 is a perspective view of a third case portion in which a ribbon roll and a winding core are accommodated.

The tape cartridge 101 will be described with reference to FIGS. 1 and 2. The tape cartridge 101 includes a tape roll 103, a ribbon roll 105, a winding core 107, a platen roller 109, and a cartridge case 111 accommodating these. Further, a circuit substrate 113 is attached to the cartridge case 111.

Figure 3:
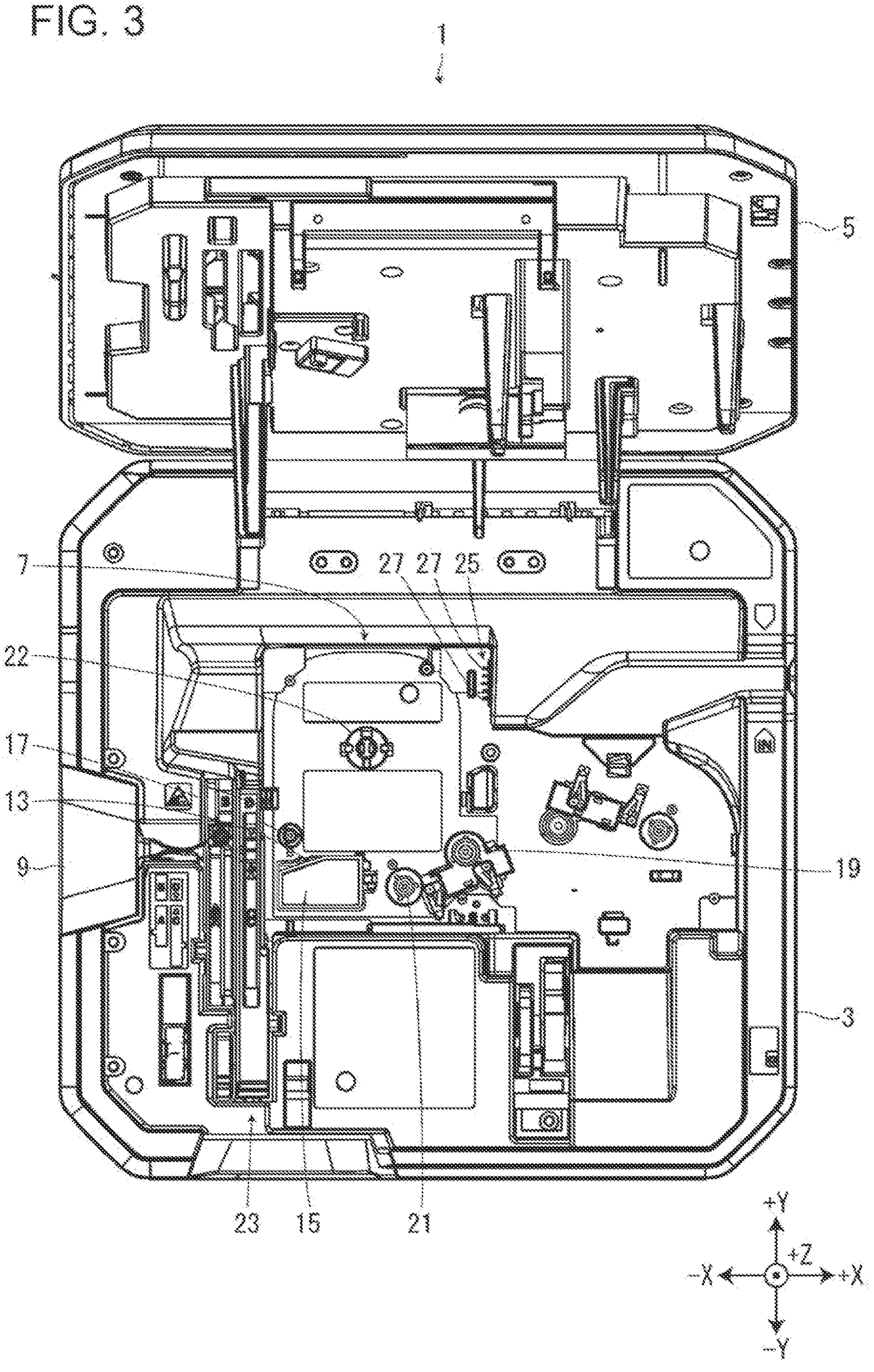
FIG. 3 is a view of the tape printing apparatus as viewed from the +Z direction.
Figure 4:
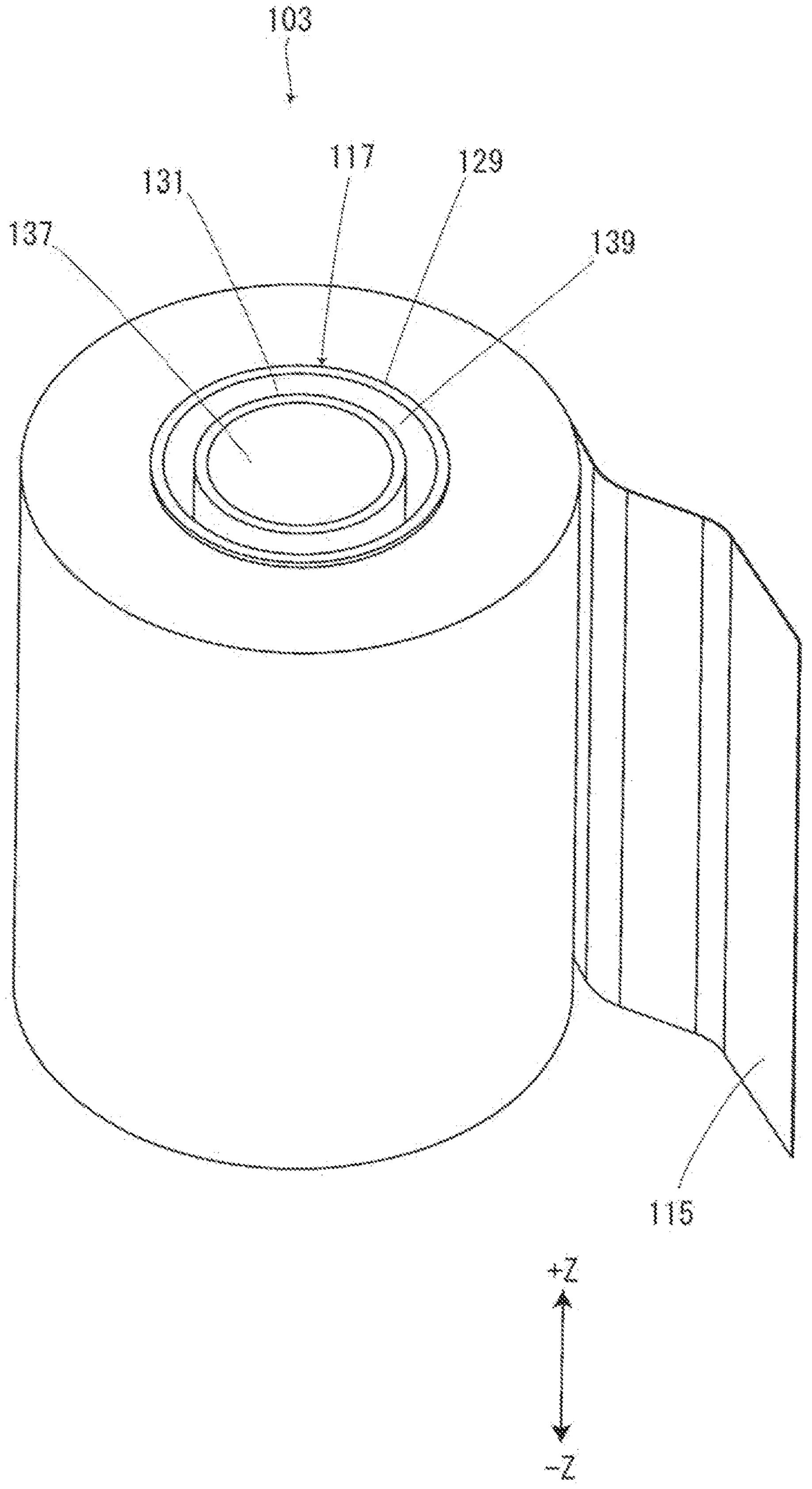
FIG. 4 is a perspective view of a tape roll.

As illustrated in FIG. 4, the tape roll 103 includes a tape 115 as a printing medium and a tape core 117 around which the tape 115 is wound. The ribbon roll 105 includes an ink ribbon 119 and a paying-out core 121 around which the ink ribbon 119 is wound. The ink ribbon 119 fed from the paying-out core 121 is wound around the winding core 107. As illustrated in FIG. 3, the platen roller 109 pinches the tape 115 and the ink ribbon 119 with a thermal head 13 provided in the tape printing apparatus 1, and feeds the pinched tape 115 and the ink ribbon 119.

A plurality of types of tape 115 having different colors, widths, materials, shapes, and the like are prepared. Similarly, a plurality of types of ink ribbons 119 having different colors, widths, and the like are prepared. In the unused tape cartridge 101, the length of the ink ribbon 119 is longer than the length of the tape 115, and when the tape 115 is made of a thick material, the length of the ink ribbon 119 is more than two times the length of the tape 115. Therefore, even when the tape roll 103 accommodated in the cartridge case 111 is in the tape end state, that is, in a state where the entire tape 115 is fed from the tape core 117, the user can continue to use the tape cartridge 101 by replacing the tape roll 103 without replacing the ribbon roll 105.

The cartridge case 111 is provided with a head insertion hole 123 penetrating in the Z axis. Further, a tape sending port 125 extending in the Z axis is provided on the surface of the cartridge case 111 in the −X direction. From the tape sending port 125, the tape 115 fed from the tape roll 103 is sent out of the cartridge case 111.

The circuit substrate 113 is provided at the end portions in the +Y direction and the −Z direction on the surface of the cartridge case 111 in the +X direction. The circuit substrate 113 includes a plurality of electrode portions 127 and storage elements (not illustrated). Various pieces of information are stored in the storage element. Examples of the various pieces of information include information indicating the color of the tape 115, information indicating the width of the tape 115, information indicating the material of the tape 115, information indicating the color of the ink ribbon 119, and information indicating the remaining amount of the ink ribbon 119, that is, the length of the ink ribbon 119 wound around the paying-out core 121. Examples of the information indicating the remaining amount of the ink ribbon 119 include information indicating the length of the ink ribbon 119 in the unused tape cartridge 101 and information indicating the length of the ink ribbon 119 consumed, that is, fed from the paying-out core 121.

Tape Printing Apparatus

The tape printing apparatus 1 will be described with reference to FIG. 3. The tape printing apparatus 1 includes an apparatus case 3 and a mounting section cover 5. The apparatus case 3 is formed in a substantially rectangular shape. A cartridge mounting section 7 is provided on a surface of the apparatus case 3 in the +Z direction. The cartridge mounting section 7 is a recess portion that is open in the +Z direction. The tape cartridge 101 is detachably mounted on the cartridge mounting section 7.

A tape discharge port 9 is provided on a surface of the apparatus case 3 in the −X direction. The tape 115 sent out of the tape cartridge 101 mounted on the cartridge mounting section 7 is discharged from the tape discharge port 9.

The mounting section cover 5 is turnably attached to the end portion of the apparatus case 3 in the +Y direction. The mounting section cover 5 opens and closes the cartridge mounting section 7.

The cartridge mounting section 7 is provided with the thermal head 13 and a head cover 15. The thermal head 13 includes a heat generating element (not illustrated) and performs printing on the tape 115. The head cover 15 partially covers the thermal head 13. When the tape cartridge 101 is mounted on the cartridge mounting section 7, the thermal head 13 and the head cover 15 are inserted into the head insertion hole 123.

From the bottom surface of the cartridge mounting section 7, the platen shaft 17, a feeding shaft 19, and a winding shaft 21 protrude in the +Z direction. When the tape cartridge 101 is mounted on the cartridge mounting section 7, the platen shaft 17, the feeding shaft 19, and the winding shaft 21 are inserted into the platen roller 109, the paying-out core 121, and the winding core 107, respectively. As a result, the rotation of the feed motor (not illustrated) can be transmitted to the platen roller 109, the paying-out core 121, and the winding core 107. Further, an insertion projection 22 protrudes from the bottom surface of the cartridge mounting section 7 in the +Z direction. When the tape cartridge 101 is mounted on the cartridge mounting section 7, the insertion projection 22 is inserted into a third core projection 159, which will be described later, illustrated in FIG. 11.

When the mounting section cover 5 is closed after the tape cartridge 101 is mounted on the cartridge mounting section 7, the thermal head 13 moves toward the platen roller 109 by a head moving mechanism (not illustrated). As a result, the tape 115 and the ink ribbon 119 are pinched between the thermal head 13 and the platen roller 109. When the platen roller 109 rotates in this state, the tape 115 and the ink ribbon 119 are fed. At this time, the thermal head 13 generates heat based on the print data received from an external apparatus such as a personal computer, and accordingly, the ink of the ink ribbon 119 is transferred to the tape 115 and the printed image is printed on the tape 115.

A cutter 23 is provided between the cartridge mounting section 7 and the tape discharge port 9. The cutter 23 cuts the tape 115 using a cutter motor (not illustrated) as a driving source. As a result, the printed part of the tape 115 is separated.

A substrate coupling section 25 is provided on the inner surface of the cartridge mounting section 7. The substrate coupling section 25 includes a plurality of contact terminal portions 27. The plurality of contact terminal portions 27 are in contact with the plurality of electrode portions 127 provided on the circuit substrate 113 of the tape cartridge 101 mounted on the cartridge mounting section 7. As a result, the circuit substrate 113 and a control section (not illustrated) included in the tape printing apparatus 1 are electrically coupled to each other via the substrate coupling section 25. The control section includes a processor and various types of memory, and controls each section of the tape printing apparatus 1. The control section reads various pieces of information stored in the circuit substrate 113 and writes various pieces of information in the circuit substrate 113 via the substrate coupling section 25.

When the control section receives the instruction to execute printing, the control section determines whether or not the printing length exceeds the remaining amount of the ink ribbon 119 based on the information indicating the remaining amount of the ink ribbon 119 read from the circuit substrate 113 and the printing length based on the print data, before starting the printing operation. That is, the control section determines whether or not the printing length exceeds the remaining amount of the ink ribbon 119, before the tape printing apparatus 1 starts feeding the tape 115 and the ink ribbon 119. When the control section determines that the printing length exceeds the remaining amount of the ink ribbon 119, the control section stops the printing operation and causes a notification section such as a display provided in the tape printing apparatus 1 or the external apparatus to notify that effect. In this manner, since the information indicating the remaining amount of the ink ribbon 119 is stored in the circuit substrate 113, it is possible to avoid a state where the ink ribbon 119 is used up in advance during printing. Further, after the printing operation is ended, the control section rewrites the information stored in the circuit substrate 113, that is, the information indicating the length of the consumed ink ribbon 119, based on the printing length indicated by the print data.

Tape Core

Figure 5:
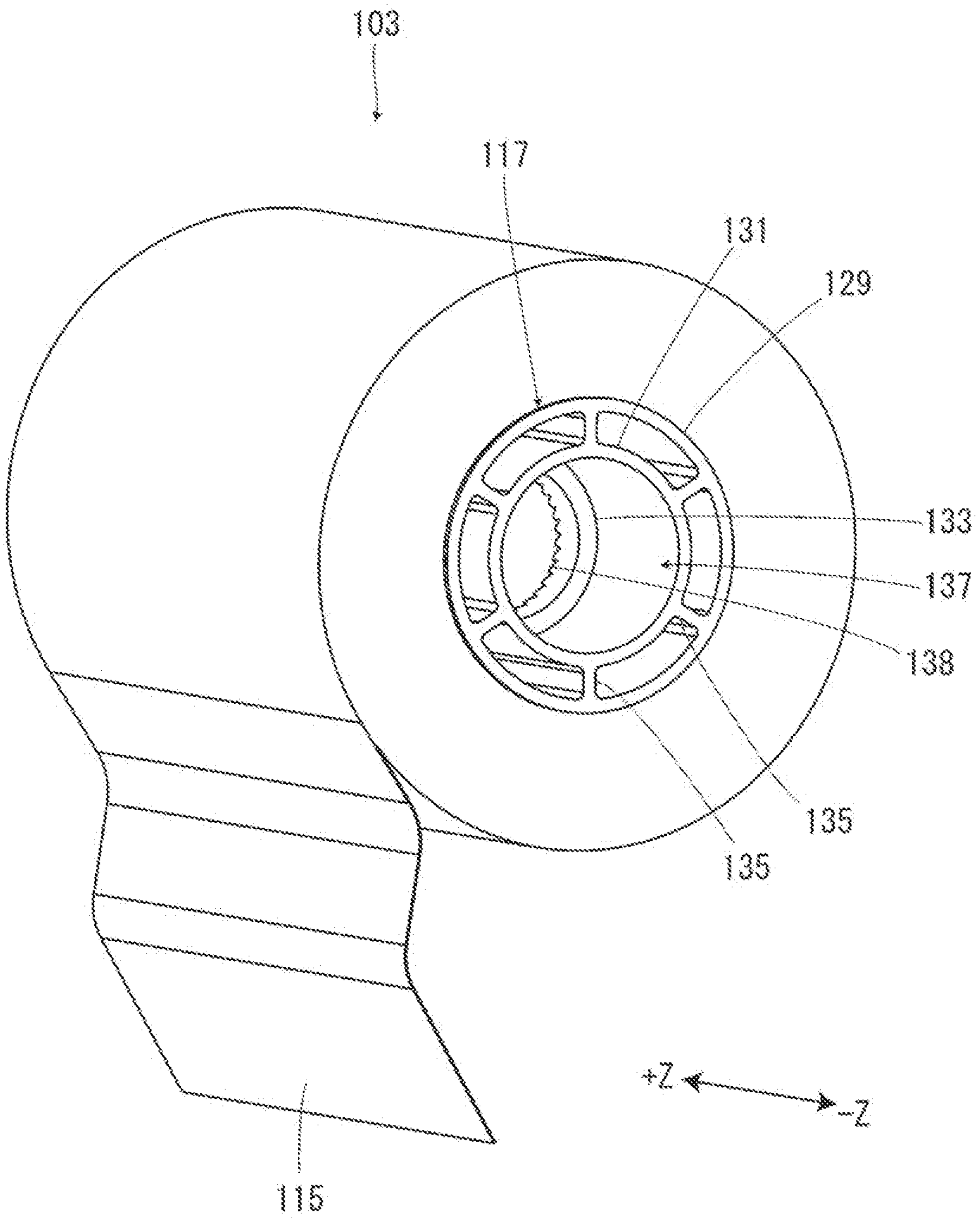
FIG. 5 is a perspective view of the tape roll when viewed from an angle different from that in FIG. 4.

The tape core 117 will be described with reference to FIGS. 4 and 5. The tape core 117 is formed in a substantially cylindrical shape. The tape core 117 includes an outer tube portion 129, an inner tube portion 131, a core hole rib portion 133, and a plurality of coupling rib portions 135. The outer tube portion 129, the inner tube portion 131, the core hole rib portion 133, and the plurality of coupling rib portions 135 are integrally formed of a resin.

Figure 11:
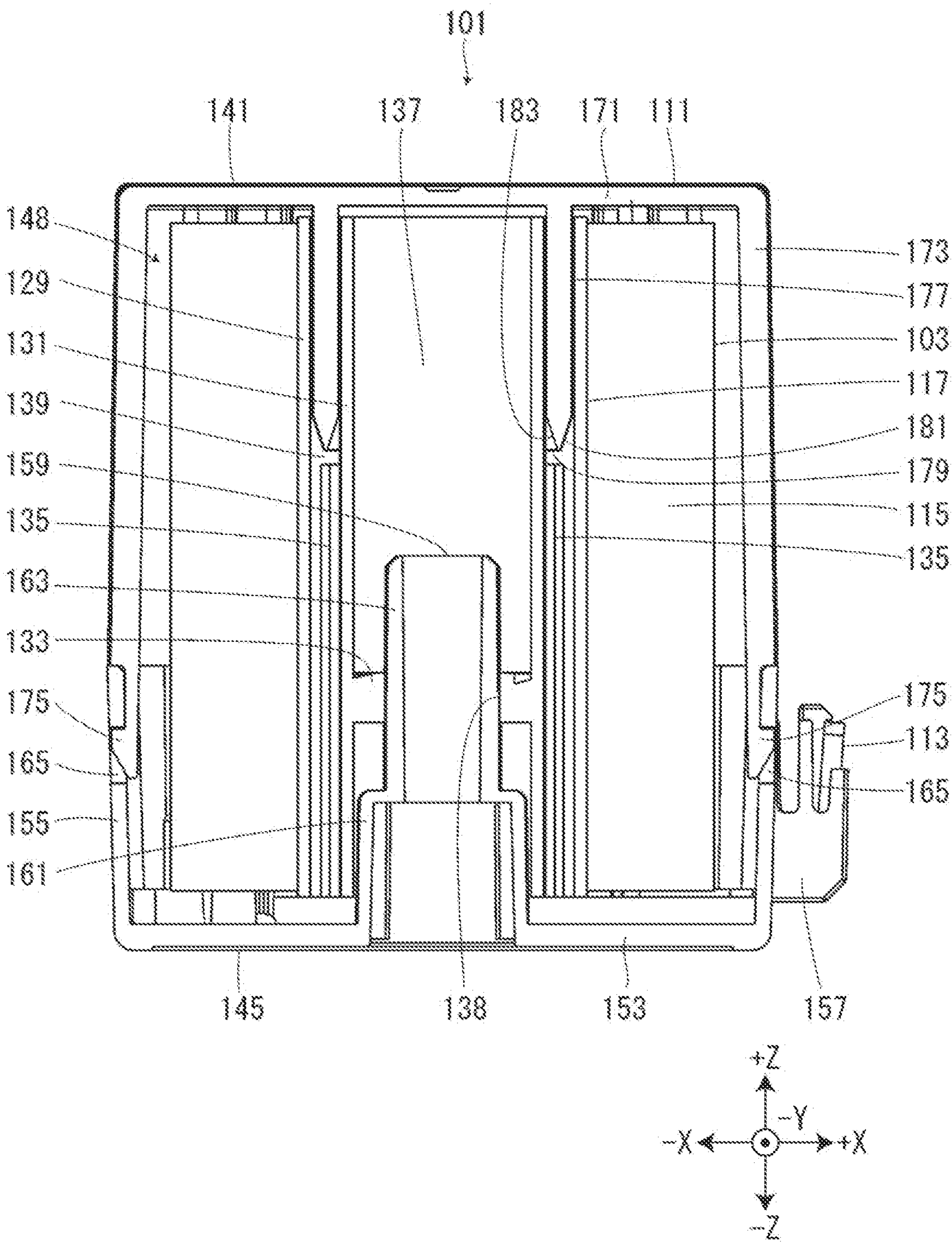
FIG. 11 is a sectional view of the tape cartridge after the mounting of the first case portion on the third case portion is completed.

The outer tube portion 129 is formed in a substantially cylindrical shape. The tape 115 is wound around the outer peripheral surface of the outer tube portion 129. The inner tube portion 131 is formed in a cylindrical shape having a diameter smaller than that of the outer tube portion 129, and is provided inside the outer tube portion 129. That is, the tape core 117 has a double-cylinder structure including an outer tube portion 129 and an inner tube portion 131. The inside of the inner tube portion 131 functions as a core hole 137 into which the third core projection 159, which will be described later, will be inserted, as illustrated in FIG. 11.

The core hole rib portion 133 is provided inside the inner tube portion 131, that is, in the core hole 137, and is formed in a substantially disk shape perpendicular to the central axis direction, that is, the Z axis of the inner tube portion 131. A projection insertion opening 138 is provided at the center of the core hole rib portion 133. The projection insertion opening 138 is formed in a substantially circular shape. As illustrated in FIG. 11, a second projection portion 163 of the third core projection 159 is inserted into the projection insertion opening 138.

Figure 10:
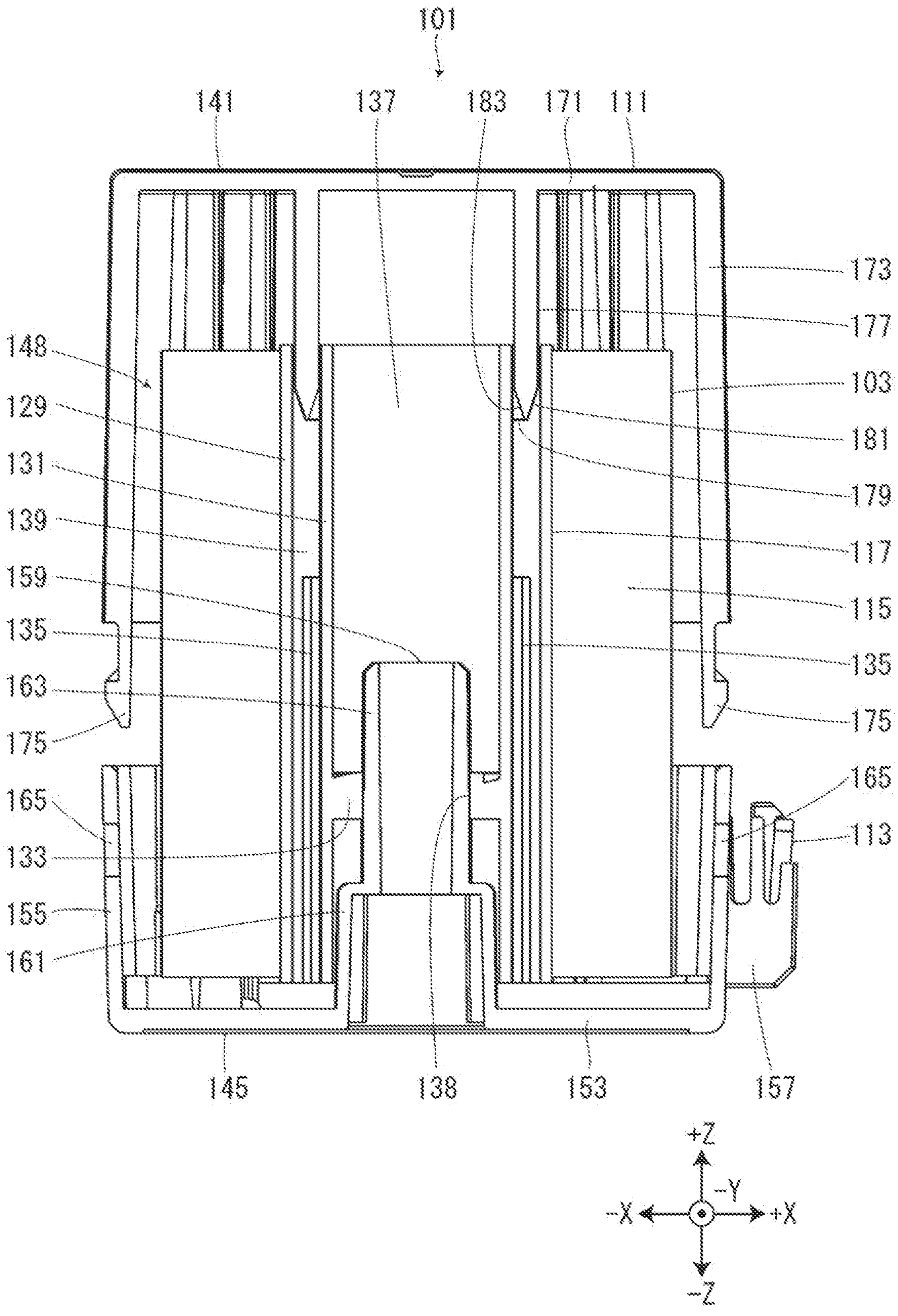
FIG. 10 is a sectional view of a tape cartridge during mounting of the first case portion on the third case portion.

The plurality of coupling rib portions 135 are coupled between the outer tube portion 129 and the inner tube portion 131 in the radial direction of the outer tube portion 129 and the inner tube portion 131, and are provided radially with respect to the central axis of the outer tube portion 129 and the inner tube portion 131. The plurality of coupling rib portions 135 extend in the Z axis between the outer tube portion 129 and the inner tube portion 131 at a part of a region in the −Z direction, for example, a region which is approximately ⅔ in the −Z direction, as illustrated in FIG. 10.

Figure 8:
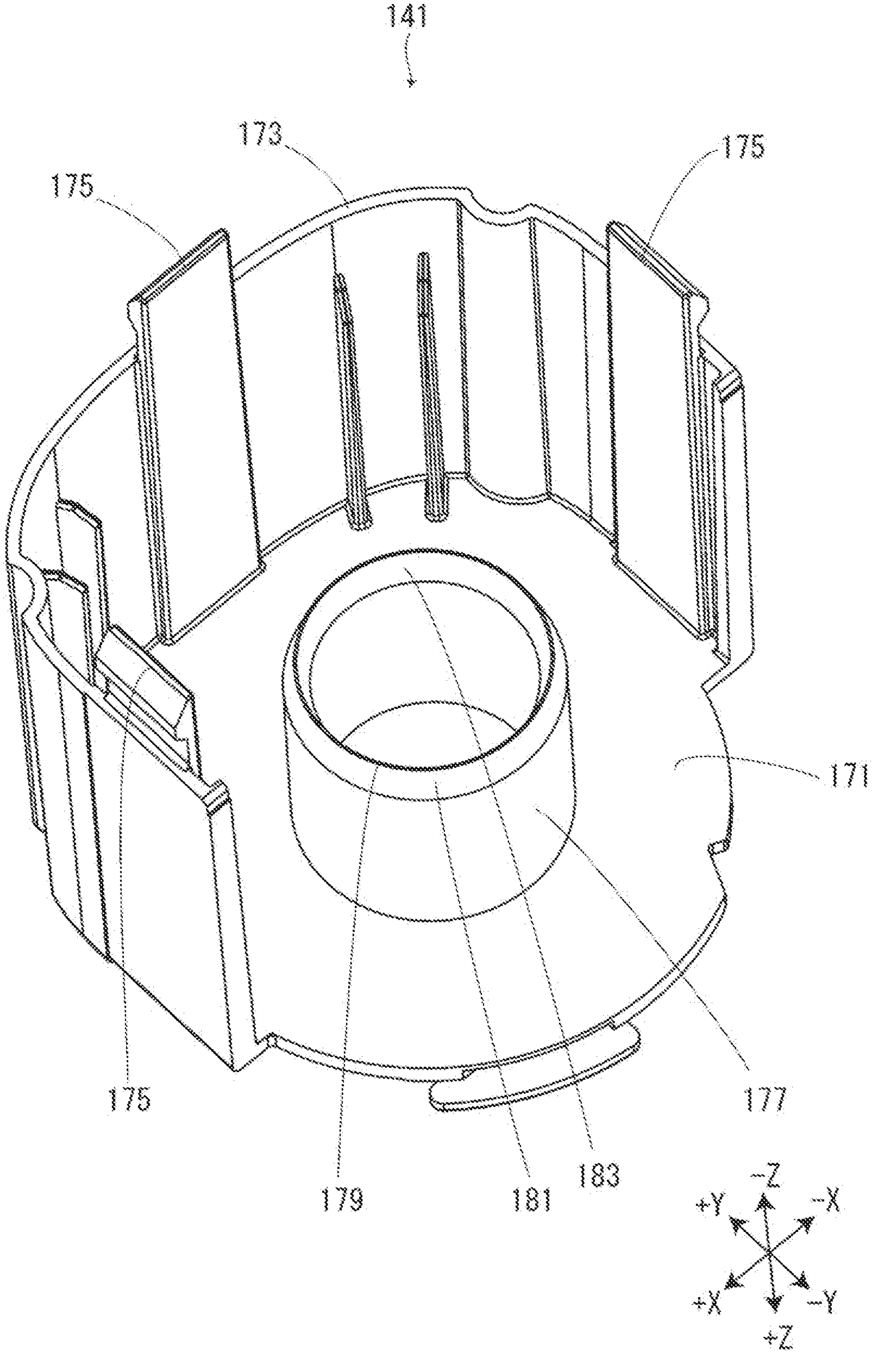
FIG. 8 is a perspective view of the first case portion.

In other words, the coupling rib portion 135 is not provided at a part of a region in the +Z direction between the outer tube portion 129 and the inner tube portion 131, for example, approximately ⅓ of the region in the +Z direction, and the region is a substantially cylindrical space, that is, an annular recess portion. This substantially cylindrical space functions as an insertion receiving section 139 into which the first core projection 177, which will be described later, will be inserted, as illustrated in FIG. 8. The insertion receiving section 139 is provided on the radially outer side of the tape core 117 with respect to the core hole 137. That is, the insertion receiving section 139 is provided to surround the core hole 137.

Cartridge Case

The cartridge case 111 will be described with reference to FIG. 1. The cartridge case 111 includes a first case portion 141, a second case portion 143, a third case portion 145, and a fourth case portion 147. The first case portion 141, the second case portion 143, and the fourth case portion 147 are positioned in the +Z direction in the cartridge case 111, and the third case portion 145 is positioned in the −Z direction in the cartridge case 111. The tape cartridge 101 is mounted on the cartridge mounting section 7 such that the third case portion 145 faces the bottom surface of the cartridge mounting section 7.

The first case portion 141, the second case portion 143, the third case portion 145, and the fourth case portion 147 are bodies separated from each other. The first case portion 141, the second case portion 143, and the fourth case portion 147 are made of a translucent resin, and the third case portion 145 is made of a non-translucent resin. However, the materials of the first case portion 141, the second case portion 143, the third case portion 145, and the fourth case portion 147 are not limited thereto.

As illustrated in FIG. 11, the first case portion 141 accommodates the tape roll 103 between the first case portion 141 and the third case portion 145. That is, the first case portion 141 and the third case portion 145 form the outer shell of a tape roll accommodation section 148 in which the tape roll 103 is accommodated. The user can close the tape roll accommodation section 148 by mounting the first case portion 141 on the third case portion 145, and by removing the first case portion 141 from the third case portion 145, the tape roll accommodation section 148 can be opened.

The second case portion 143 is provided in the −Y direction with respect to the first case portion 141. The second case portion 143 accommodates the ribbon roll 105 and the winding core 107 between the second case portion 143 and the third case portion 145. That is, the second case portion 143 and the third case portion 145 form the outer shell of an ink ribbon accommodation section 149 in which the ribbon roll 105 and the winding core 107 are accommodated.

The fourth case portion 147 is provided between the first case portion 141 and the second case portion 143 at the end portion of the cartridge case 111 in the −X direction. The fourth case portion 147 and the third case portion 145 accommodate the platen roller 109. That is, the third case portion 145 and the fourth case portion 147 form the outer shell of the platen roller accommodation section 151 in which the platen roller 109 is accommodated.

Figure 7:
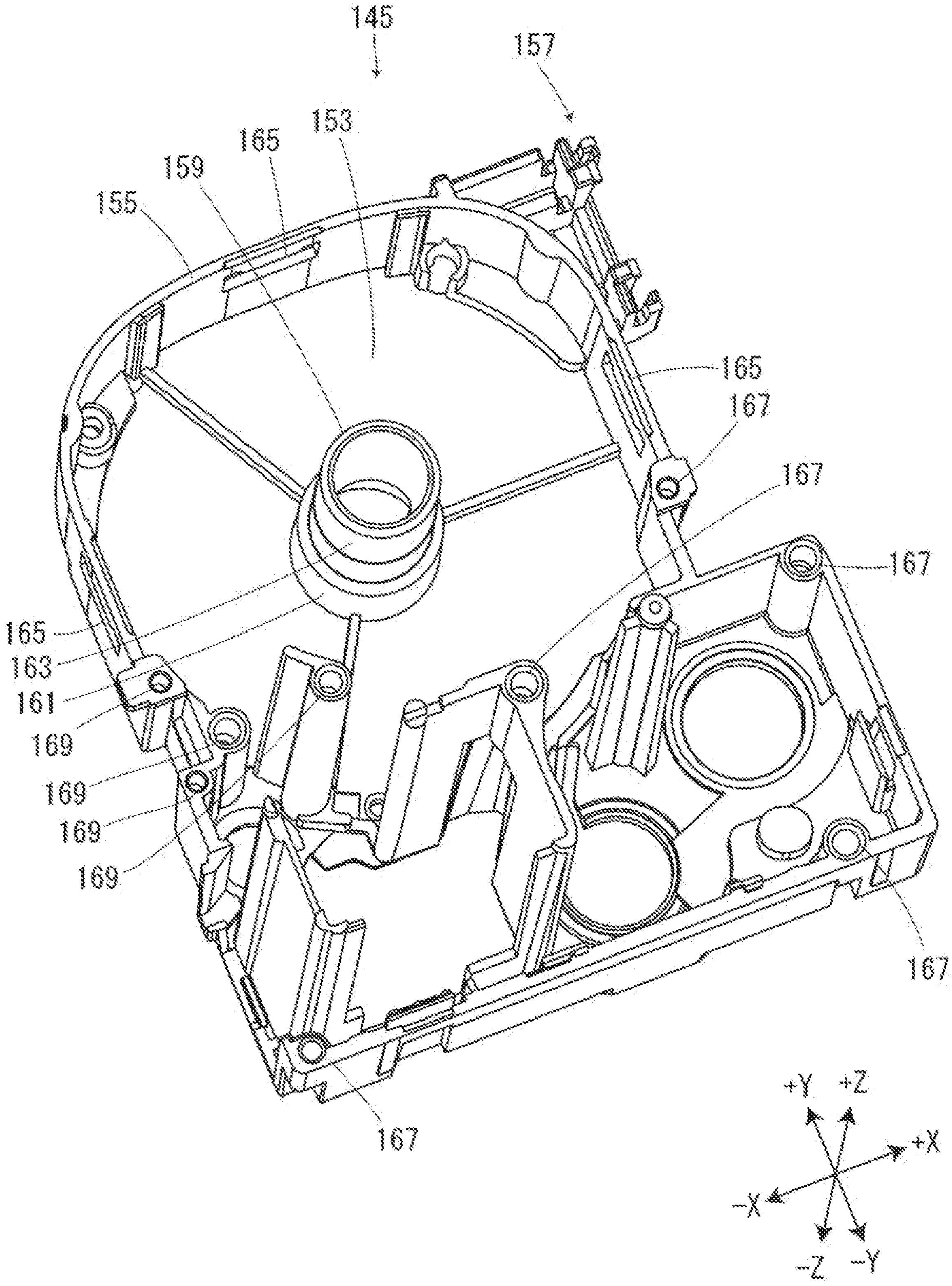
FIG. 7 is a perspective view of a third case portion.

In the second case portion 143, a second engaging pin (not illustrated) provided in the second case portion 143 is press-fitted into a third A engaging hole 167 provided in the third case portion 145 as illustrated in FIG. 7, and accordingly, the second case portion 143 and the third case portion 145 are combined with each other. Therefore, the user can remove the second case portion 143 from the third case portion 145 by using a predetermined cartridge disassembling device, but it is difficult to manually remove the second case portion 143 from the third case portion 145.

Similarly, a fourth engaging pin (not illustrated) provided in the fourth case portion 147 is press-fitted into a third B engaging hole 169 provided in the third case portion 145 as illustrated in FIG. 7, and accordingly, the fourth case portion 147 and the third case portion 145 are combined with each other. Therefore, the user can remove the fourth case portion 147 from the third case portion 145 by using a predetermined cartridge disassembling device, but it is difficult to manually remove the fourth case portion 147 from the third case portion 145.

Figure 6:
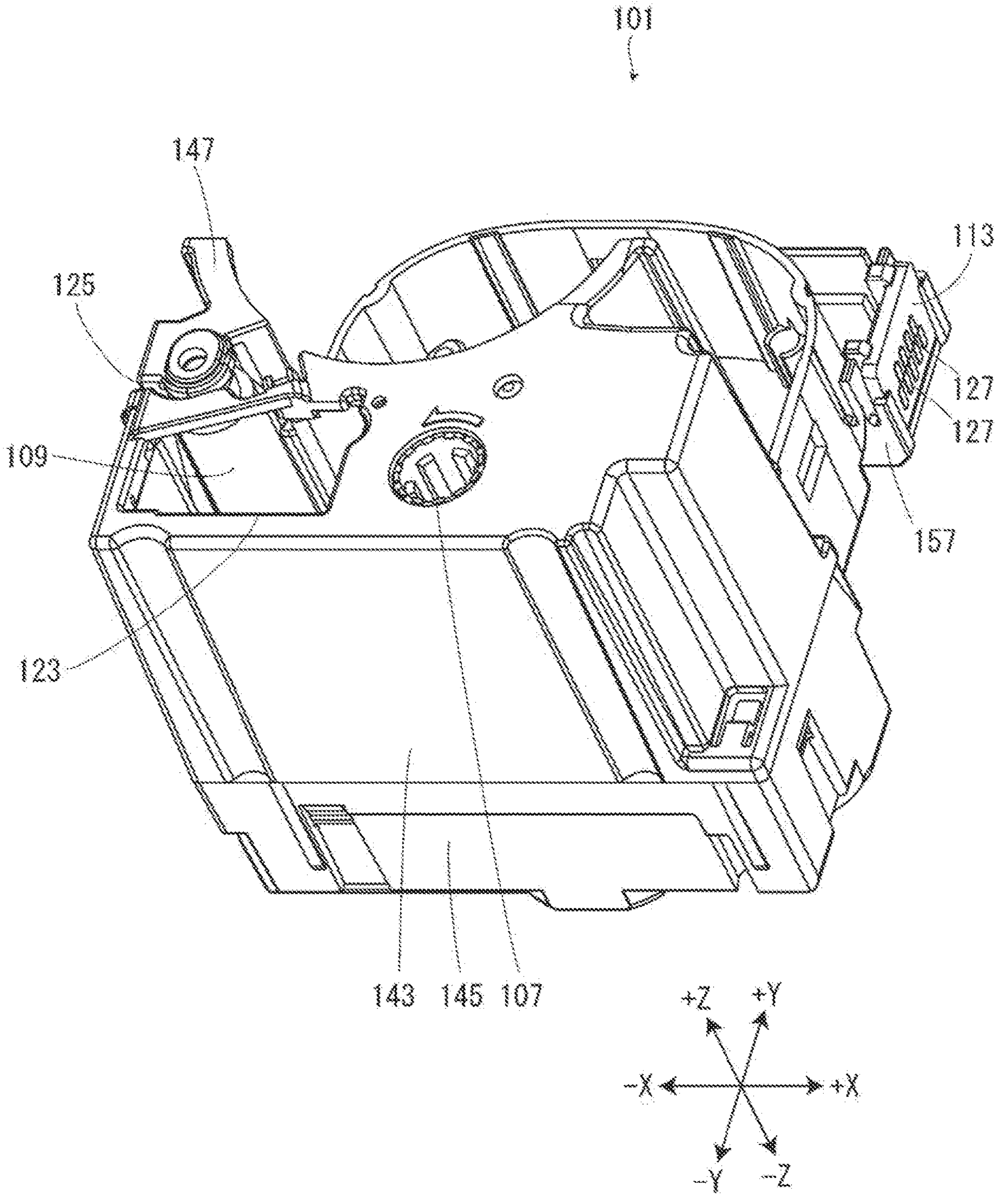
FIG. 6 is a perspective view of a tape cartridge from which the first case portion was removed.

In response to these, as will be described later, three first engaging protrusion portions 175 provided in the first case portion 141 as illustrated in FIG. 8 are engaged with three third engagement receiving sections 165 provided in the third case portion 145 as illustrated in FIG. 7, and accordingly, the first case portion 141 is mounted on the third case portion 145. Therefore, as illustrated in FIG. 6, the user can easily remove the first case portion 141 from the third case portion 145 manually without using the cartridge disassembling device. At this time, the second case portion 143 and the fourth case portion 147 are still combined with the third case portion 145. In addition, FIG. 6 illustrates a state where the tape core 117 is removed from the cartridge case 111 after the first case portion 141 is removed. In addition, for the sake of illustration, the ink ribbon 119 is omitted in FIG. 6.

In the tape cartridge 101, when the user replaces the tape roll 103 with another tape roll 103, the user first removes the first case portion 141 from the third case portion 145 and takes out the tape roll 103 from the cartridge case 111. Subsequently, the user places another tape roll 103 in the third case portion 145. Subsequently, the user mounts the first case portion 141 to the third case portion 145, and ends the replacement work of the tape roll 103.

Third Case Portion

The third case portion 145 will be described with reference to FIG. 7. The third case portion 145 includes a third base wall portion 153, a third side wall portion 155 protruding in the +Z direction from the peripheral edge portion of the third base wall portion 153, and a substrate attaching section 157 provided on the outside of the third side wall portion 155.

The third base wall portion 153 is formed in a plate shape parallel to the XY plane. The third core projection 159 protrudes from the third base wall portion 153 in the +Z direction. The third core projection 159 is formed in a substantially stepped cylindrical shape, and the insertion projection 22 described above is inserted into the third core projection 159. The third core projection 159 includes a first projection portion 161 and a second projection portion 163. The first projection portion 161 is provided on the proximal end side of the third core projection 159, that is, in the −Z direction. The second projection portion 163 is provided on the tip end side of the third core projection 159, that is, in the +Z direction. As illustrated in FIG. 11, the diameter of the second projection portion 163 is smaller than that of the first projection portion 161 and slightly smaller than that of the projection insertion opening 138 described above. The third core projection 159 is inserted into the core hole 137 of the tape core 117 from the −Z direction. At this time, the second projection portion 163 is inserted into the projection insertion opening 138. The third core projection 159 rotatably supports the tape roll 103 together with the first core projection 177 which will be described later.

The substrate attaching section 157 is positioned at the end portion in the +X direction and the +Y direction in the third case portion 145, and is provided on the outside of the third side wall portion 155. The circuit substrate 113 is attached to the substrate attaching section 157.

The third case portion 145 is provided with three third engagement receiving sections 165, five third A engaging holes 167, and four third B engaging holes 169.

The three third engagement receiving sections 165 are provided on the third side wall portion 155 corresponding to the positions where the first case portion 141 is combined with the third case portion 145. The three third engagement receiving sections 165 are disengageably engaged with the three first engaging protrusion portions 175 provided in the first case portion 141. As a result, the first case portion 141 is detachably mounted on the third case portion 145.

The five third A engaging holes 167 are provided on the third side wall portion 155 or the like corresponding to the positions where the second case portion 143 is combined with the third case portion 145. The five second engaging pins provided in the second case portion 143 are press-fitted into the five third A engaging holes 167 from the +Z direction. As a result, the second case portion 143 is combined with the third case portion 145.

The four third B engaging holes 169 are provided on the third side wall portion 155 or the like corresponding to the positions where the fourth case portion 147 is combined with the third case portion 145. The four fourth engaging pins provided in the fourth case portion 147 are press-fitted into the four third B engaging holes 169 from the +Z direction. As a result, the fourth case portion 147 is combined with the third case portion 145.

First Case Portion

The first case portion 141 will be described with reference to FIGS. 8 and 9. The first case portion 141 includes a first base wall portion 171 and a first side wall portion 173 protruding in the −Z direction from a peripheral edge portion of the first base wall portion 171.

The first case portion 141 is provided with three first engaging protrusion portions 175. The three first engaging protrusion portions 175 protrude from the first side wall portion 173 in the −Z direction. The three first engaging protrusion portions 175 are disengageably engaged with the three third engagement receiving sections 165 provided in the third case portion 145. As a result, the first case portion 141 is detachably mounted on the third case portion 145.

The first base wall portion 171 is positioned in the +Z direction with respect to the third base wall portion 153 when the first case portion 141 is mounted on the third case portion 145, and is formed in a plate shape parallel to the XY plane. The first core projection 177 protrudes from the first base wall portion 171 in the −Z direction. The first core projection 177 is formed in a substantially cylindrical shape. As illustrated in FIG. 10, the thickness of the first core projection 177, that is, the difference between the outer diameter and the inner diameter of the first core projection 177 is slightly smaller than the width of the insertion receiving section 139 provided in the tape core 117, that is, the difference between the inner diameter of the outer tube portion 129 and the outer diameter of the inner tube portion 131.

As illustrated in FIG. 10, the first core projection 177 is inserted into the insertion receiving section 139 provided in the tape core 117 from the +Z direction. The first core projection 177 rotatably supports the tape roll 103 together with the third core projection 159 described above.

As described above, since the tape roll 103 is rotatably supported by the first core projection 177 inserted into the insertion receiving section 139, compared to the configuration in which the first core projection 177 is inserted into the core hole 137, the tape roll 103 is supported by the first core projection 177 at a position farther from the rotation axis of the tape roll 103. Therefore, when the user replaces the tape roll 103 or the like, shaking of the rotation axis of the tape roll 103 is suppressed, and the travelability of the tape 115 can be stabilized. Further, it is conceivable to increase the diameters of the outer tube portion 129 and the inner tube portion 131 such that the inside of the inner tube portion 131, that is, the core hole 137 functions as the insertion receiving section 139. However, in this case, the length of the tape 115 that can be wound around the tape roll 103 is shortened.

Figure 9:
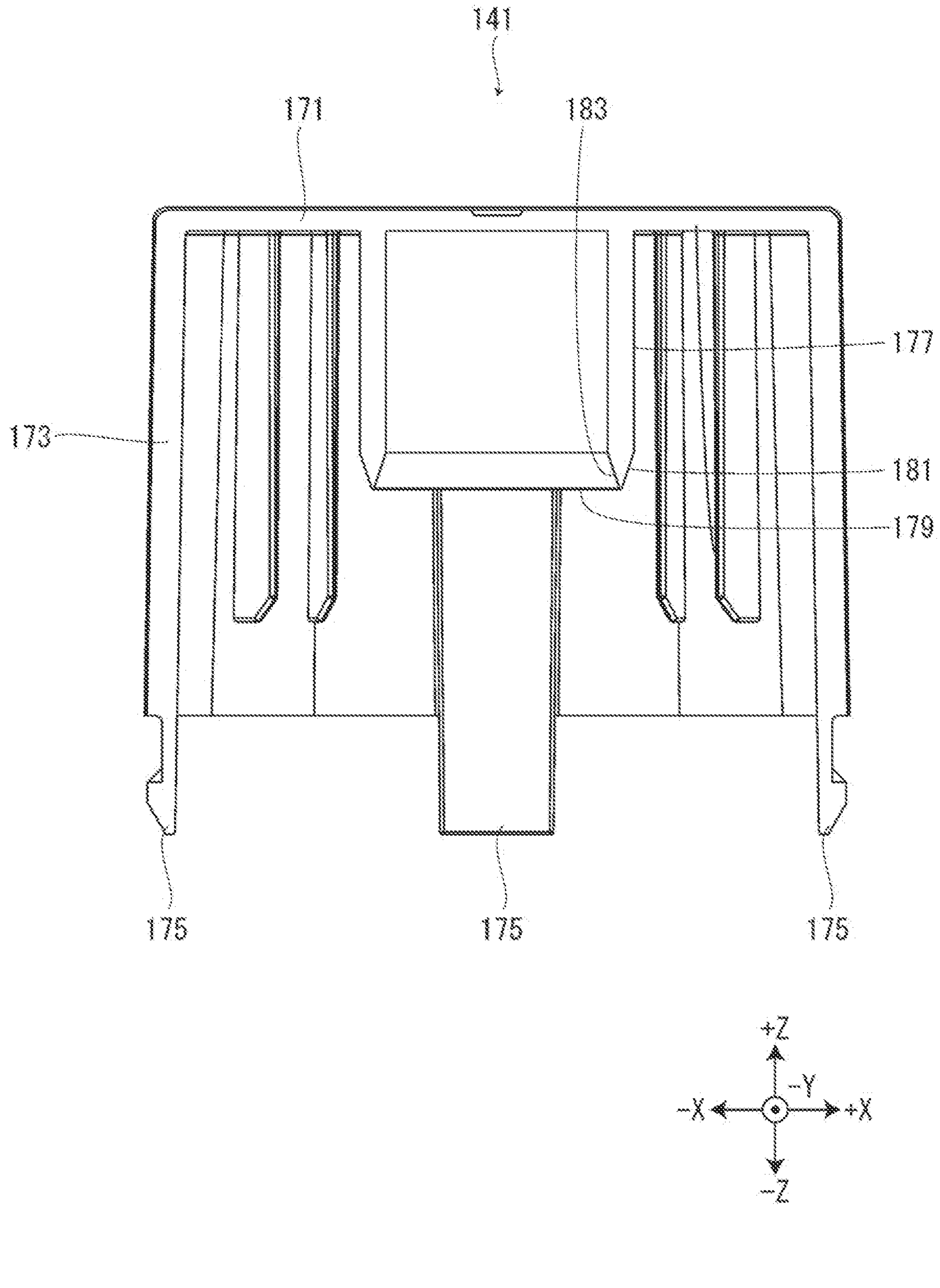
FIG. 9 is a sectional view of the first case portion.

As illustrated in FIG. 9, the tip end portion of the first core projection 177, that is, a first projection tip end portion 179 is perpendicular to the protruding direction, that is, the −Z direction of the first core projection 177. That is, the protrusion amount of the first core projection 177 from the first base wall portion 171 is substantially the same at any location in the peripheral direction of the first core projection 177.

An outer peripheral side inclined surface 181 is provided on the outer peripheral side of the first projection tip end portion 179. The outer peripheral side inclined surface 181 is inclined with respect to the protruding direction of the first core projection 177. That is, the outer peripheral side inclined surface 181 is inclined such that the end portion of the first core projection 177 on the tip end side, that is, the end portion of the outer peripheral side inclined surface 181 in the −Z direction is positioned on the radially outer side of the first core projection 177 with respect to the end portion on the proximal end side of the first core projection 177, that is, the end portion of the outer peripheral side inclined surface 181 in the +Z direction.

An inner peripheral side inclined surface 183 is provided on the inner peripheral side of the first projection tip end portion 179. The inner peripheral side inclined surface 183 is inclined with respect to the protruding direction of the first core projection 177. That is, the inner peripheral side inclined surface 183 is inclined such that the end portion of the first core projection 177 on the tip end side, that is, the end portion of the inner peripheral side inclined surface 183 in the −Z direction is positioned on the radially outer side of the first core projection 177 with respect to the end portion on the proximal end side of the first core projection 177, that is, the end portion of the inner peripheral side inclined surface 183 in the +Z direction.

When the first core projection 177 is inserted into the insertion receiving section 139, even when the outer peripheral side inclined surface 181 of the first projection tip end portion 179 comes into contact with an edge portion on the outside of the insertion receiving section 139, that is, an end portion of the outer tube portion 129 in the +Z direction, the first projection tip end portion 179 is guided to the insertion receiving section 139 by the outer peripheral side inclined surface 181. When the first core projection 177 is inserted into the insertion receiving section 139, even when the inner peripheral side inclined surface 183 of the first projection tip end portion 179 comes into contact with an edge portion on the inside of the insertion receiving section 139, that is, an end portion of the inner tube portion 131 in the +Z direction, the first projection tip end portion 179 is guided to the insertion receiving section 139 by the inner peripheral side inclined surface 183. Therefore, the first core projection 177 can be easily inserted into the insertion receiving section 139.

In addition, in a process in which the first case portion 141 is mounted on the third case portion 145, as illustrated in FIG. 10, before the first engaging protrusion portion 175 and the third engagement receiving section 165 are engaged with each other, the first core projection 177 is inserted into the insertion receiving section 139, and thereafter, the first engaging protrusion portion 175 and the third engagement receiving section 165 are engaged with each other. Therefore, before the first engaging protrusion portion 175 engages with the third engagement receiving section 165, the first core projection 177 and the insertion receiving section 139 cause the first case portion 141 to be positioned with respect to the third case portion 145, and thus, the first engaging protrusion portion 175 and the third engagement receiving section 165 can be easily engaged with each other.

As described above, the tape cartridge 101 of the present embodiment includes the tape roll 103 and the cartridge case 111 accommodating the tape roll 103. The tape roll 103 includes the tape 115 and the tape core 117. The tape core 117 is provided with the core hole 137, and the tape 115 is wound around the tape core 117. The cartridge case 111 includes the first case portion 141 and the third case portion 145. The first case portion 141 includes a first base wall portion 171 and a first core projection 177 protruding from the first base wall portion 171 in the −Z direction. The third case portion 145 includes the third base wall portion 153 and the third core projection 159 protruding from the third base wall portion 153 in the +Z direction. The third core projection 159 is inserted into the core hole 137. The tape core 117 is provided with the insertion receiving section 139. The insertion receiving section 139 is positioned on the radially outer side of the tape core 117 with respect to the core hole 137. The first core projection 177 is inserted into the insertion receiving section 139.

According to this configuration, since the tape roll 103 is rotatably supported by the first core projection 177 inserted into the insertion receiving section 139, compared to the configuration in which the first core projection 177 is inserted into the core hole 137, the tape roll 103 is supported by the first core projection 177 at a position farther from the rotation axis of the tape roll 103. Therefore, when the user replaces the tape roll 103 or the like, shaking of the rotation axis of the tape roll 103 is suppressed, and the travelability of the tape 115 can be stabilized.

Other Modification Examples

It is needless to say that the present disclosure is not limited to the above-described embodiment, and various configurations can be adopted without departing from the gist thereof. For example, the above-described embodiment can be changed to the following aspects in addition to the above-described aspects. In addition, a configuration in which embodiments and modification examples are combined may be used.

Figure 12:
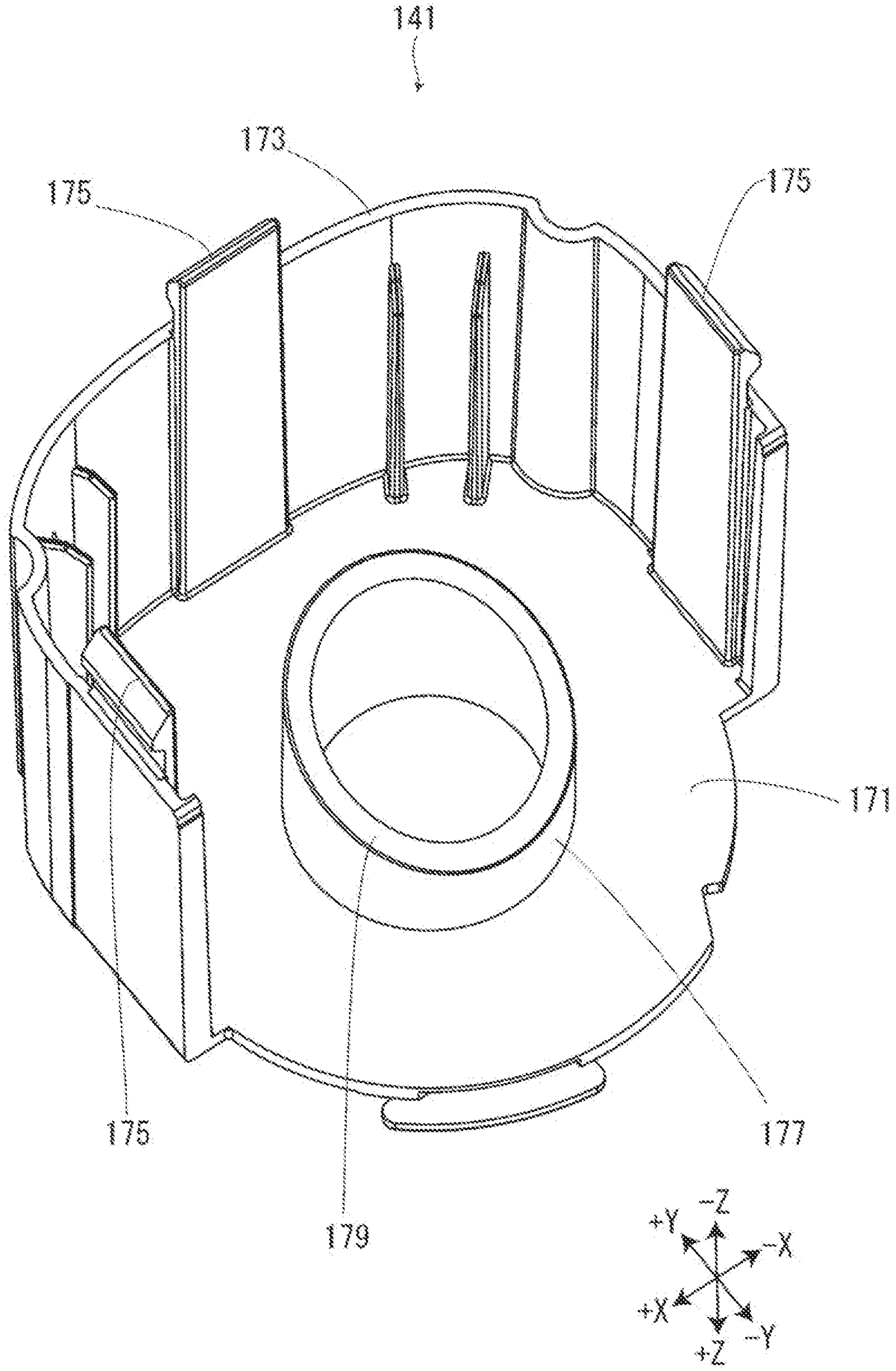
FIG. 12 is a perspective view of a first case portion according to a modification example.
Figure 13:
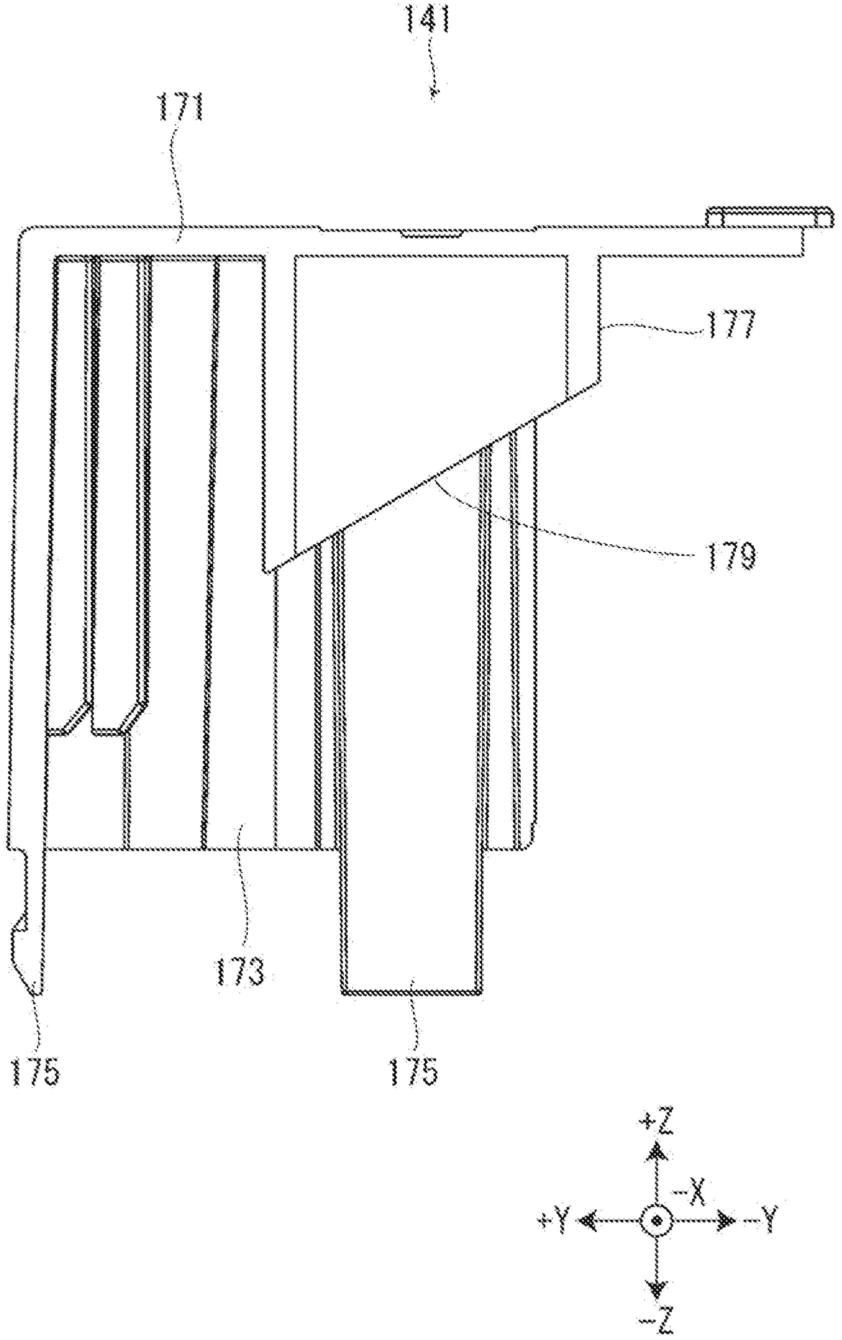
FIG. 13 is a sectional view of a first case portion according to a modification example.

The first projection tip end portion 179 is not limited to a configuration that is perpendicular to the protruding direction of the first core projection 177. For example, as illustrated in FIGS. 12 and 13, the first projection tip end portion 179 may be configured to be inclined with respect to the protruding direction of the first core projection 177. In this case, the shape of the first core projection 177 is a substantially decapitated cylindrical shape, that is, a shape in which the tip end portion of the cylinder is cut obliquely with respect to the central axis of the cylinder. That is, in the first projection tip end portion 179, the end portion of the first projection tip end portion 179 in the +Y direction has a larger protrusion amount from the first base wall portion 171 than the end portion in the −Y direction. Further, the direction of inclination of the first projection tip end portion 179 is not limited to this, and the first projection tip end portion 179 may be inclined such that one end portion of the first core projection 177 in the peripheral direction in the first projection tip end portion 179 has a larger protrusion amount from the first base wall portion 171 than that of the end portion that is point symmetrical with one end portion about the central axis of the first core projection 177.

As described above, since the first projection tip end portion 179 is inclined with respect to the protruding direction of the first core projection 177, the first projection tip end portion 179 has a shape in which the end portion in the +Y direction is sharp. Therefore, the first core projection 177 can be inserted into the insertion receiving section 139 from the sharp end portion in the +Y direction. Therefore, the first core projection 177 can be easily inserted into the insertion receiving section 139.

The first core projection 177 is not limited to the configuration formed in the substantially cylindrical shape described above or the substantially decapitated cylindrical shape illustrated in FIG. 12, as illustrated in FIG. 8. For example, the first core projection 177 may be configured by a plurality of protrusion portions arranged in an annular shape corresponding to the insertion receiving section 139. That is, the first core projection 177 does not need to be continuous in the peripheral direction. In this case, the shape of each protrusion portion may be, for example, a substantially annular fan shape or a pin shape.

The insertion receiving section 139 is not limited to the tape core 117 having a double-cylinder structure configured by a space between the outer tube portion 129 and the inner tube portion 131. For example, the insertion receiving section 139 may be configured by an annular recess portion provided on an end surface in the +Z direction in the tape core 117 having a single structure.

Figure 14:
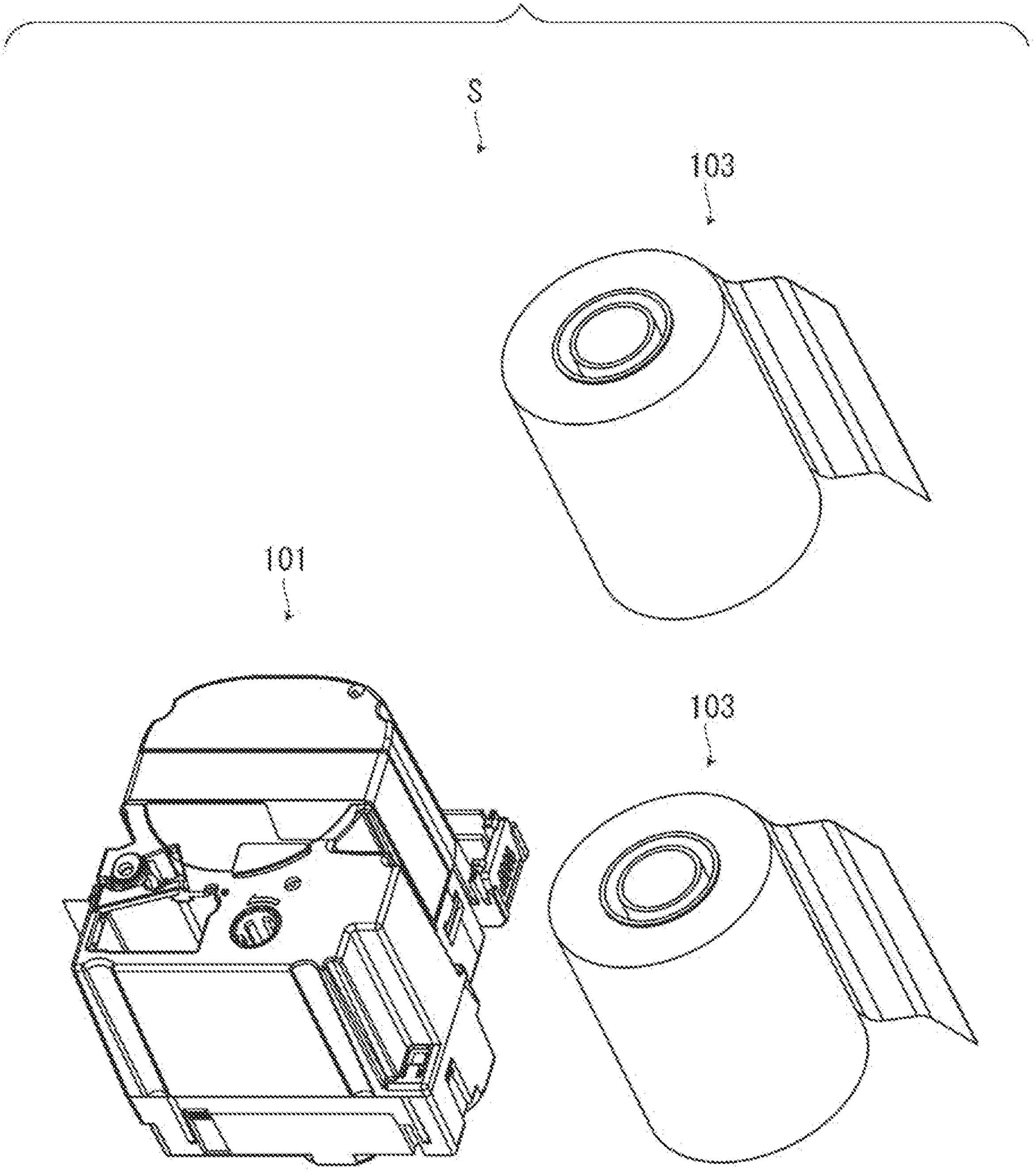
FIG. 14 is a perspective view of a tape cartridge set.

As illustrated in FIG. 14, the plurality of tape rolls 103 and the tape cartridge 101 may form a tape cartridge set S. That is, the tape cartridge set S includes the plurality of tape rolls 103 and the tape cartridge 101. As a result, in addition to the tape cartridge 101, a replacement tape roll 103 can be provided to the user in advance. Further, the tape cartridge set S may be configured to include the cartridge case 111 instead of the tape cartridge 101. That is, the tape cartridge set S may be configured to include the cartridge case 111 and the plurality of tape rolls 103. In this case, the user can create the tape cartridge 101 by accommodating the tape roll 103, which is one of the plurality of tape rolls 103, in the cartridge case 111.

Additional Note

Hereinafter, the tape cartridge, the tape roll, and the tape cartridge set will be additionally described.

There is provided a tape cartridge including: a tape roll including a tape and a tape core which is provided with a core hole and around which the tape is wound; and a cartridge case accommodating the tape roll, and including a first case portion having a first base wall portion and a first core projection protruding from the first base wall portion in a first direction, and a third case portion having a third base wall portion and a third core projection protruding from the third base wall portion in a third direction opposite to the first direction and inserted into the core hole, in which the tape core is provided with an insertion receiving section which is positioned on a radially outer side of the tape core with respect to the core hole and into which the first core projection is inserted.

According to this configuration, since the tape roll is rotatably supported by the first core projection inserted into the insertion receiving section, compared to the configuration in which the first core projection is inserted into the core hole, the tape roll is supported by the first core projection at a position farther from the rotation axis of the tape roll. Therefore, when the user replaces the tape roll or the like, shaking of the rotation axis of the tape roll is suppressed, and the travelability of the tape can be stabilized.

Further, the −Z direction is an example of the "first direction." The +Z direction is an example of the "third direction."

In this case, it is preferable that an outer peripheral side of a tip end portion of the first core projection be provided with an outer peripheral side inclined surface inclined with respect to the first direction, and an inner peripheral side of the tip end portion of the first core projection be provided with an inner peripheral side inclined surface inclined with respect to the first direction.

According to this configuration, when the first core projection is inserted into the insertion receiving section, even when the outer peripheral side inclined surface of the first projection tip end portion comes into contact with an edge portion on the outside of the insertion receiving section, the tip end portion of the first core projection is guided to the insertion receiving section by the outer peripheral side inclined surface. When the first core projection is inserted into the insertion receiving section, even when the inner peripheral side inclined surface of the first projection tip end portion comes into contact with an edge portion on the inside of the insertion receiving section, the tip end portion of the first core projection is guided to the insertion receiving section by the inner peripheral side inclined surface. Therefore, the first core projection can be easily inserted into the insertion receiving section.

In this case, it is preferable that the tip end portion of the first core projection be inclined with respect to the first direction.

According to this configuration, since the tip end portion of the first core projection has a sharp shape, the first core projection can be inserted into the insertion receiving section from the sharp location. Therefore, the first core projection can be easily inserted into the insertion receiving section.

In this case, it is preferable that an ink ribbon accommodated in the cartridge case further be provided, the cartridge case accommodate the tape roll in a replaceable manner with another tape roll, and in an unused tape cartridge, a length of the ink ribbon be at least two times a length of the tape.

According to this configuration, even when the tape roll accommodated in the cartridge case is in the tape end state, the user can continue to use the tape cartridge by replacing only the tape roll without replacing the ink ribbon.

In this case, it is preferable that a circuit substrate configured to store information indicating a remaining amount of the ink ribbon further be provided, and the tape cartridge A be configured to be mounted on the tape printing apparatus configured to read the information stored in the circuit substrate.

According to this configuration, information indicating the remaining amount of the ink ribbon can be provided to the tape printing apparatus to which the tape cartridge is mounted.

There is provided a tape roll configured to be accommodated in a cartridge case including a first case portion having a first base wall portion and a first core projection protruding from the first base wall portion in a first direction, and a third case portion having a third base wall portion and a third core projection protruding from the third base wall portion in a third direction opposite to the first direction, the tape roll including: a tape; and a tape core provided with a core hole into which the third core projection is inserted, and around which the tape is wound, in which the tape core is provided with an insertion receiving section which is positioned on a radially outer side of the tape core with respect to the core hole and into which the first core projection is configured to be inserted.

According to this configuration, since the tape roll is rotatably supported by the first core projection inserted into the insertion receiving section, compared to the configuration in which the first core projection is inserted into the core hole, the tape roll is supported by the first core projection at a position farther from the rotation axis of the tape roll.

Therefore, when the user replaces the tape roll or the like, shaking of the rotation axis of the tape roll is suppressed, and the travelability of the tape can be stabilized.

There is provided a tape cartridge set including: a plurality of tape rolls including a tape and a tape core which is provided with a core hole and an annular recess portion positioned on a radially outer side of the tape roll with respect to the core hole and around which the tape is wound; and a cartridge case including a first case portion having a first base wall portion and a first core projection protruding from the first base wall portion in a first direction and inserted into the annular recess portion, and a third case portion having a third base wall portion and a third core projection protruding from the third base wall portion in a third direction opposite to the first direction and inserted into the core hole, and configured to accommodate one tape roll of the plurality of tape rolls.

According to this configuration, since the tape roll is rotatably supported by the first core projection inserted into the insertion receiving section, compared to the configuration in which the first core projection is inserted into the core hole, the tape roll is supported by the first core projection at a position farther from the rotation axis of the tape roll. Therefore, when the user replaces the tape roll or the like, shaking of the rotation axis of the tape roll is suppressed, and the travelability of the tape can be stabilized. Further, in addition to the tape cartridge, a replacement tape roll can be provided to the user in advance.

Further, the insertion receiving section 139 is an example of an "annular recess portion."

What is claimed is:

1. A tape cartridge comprising:
- a tape roll including a tape and a tape core which is provided with a core hole and around which the tape is wound; and
- a cartridge case accommodating the tape roll, and including a first case portion having a first base wall portion and a first core projection protruding from the first base wall portion in a first direction, and a third case portion having a third base wall portion and a third core projection protruding from the third base wall portion in a third direction opposite to the first direction and inserted into the core hole, wherein
- the tape core is provided with an insertion receiving section which is positioned on a radially outer side of the tape core with respect to the core hole and into which the first core projection is inserted, and
- when the first core projection is inserted into the insertion receiving section and the third core projection is inserted into the core hole, the first core projection is positioned on the radially outer side of the third core projection with respect to the core hole.

2. The tape cartridge according to claim 1, wherein
- an outer peripheral side of a tip end portion of the first core projection is provided with an outer peripheral side inclined surface inclined with respect to the first direction, and
- an inner peripheral side of the tip end portion of the first core projection is provided with an inner peripheral side inclined surface inclined with respect to the first direction.

3. The tape cartridge according to claim 1, wherein
- a tip end portion of the first core projection is inclined with respect to the first direction.

4. The tape cartridge according to claim 1, further comprising:
- an ink ribbon accommodated in the cartridge case, wherein
- the cartridge case accommodates the tape roll in a replaceable manner with another tape roll, and
- in an unused tape cartridge, a length of the ink ribbon is at least two times a length of the tape.

5. The tape cartridge according to claim 4, further comprising:
- a circuit substrate configured to store information indicating a remaining amount of the ink ribbon, wherein
- the tape cartridge is configured to be mounted on a tape printing apparatus configured to read the information stored in the circuit substrate.

6. A tape roll configured to be accommodated in a cartridge case including a first case portion having a first base wall portion and a first core projection protruding from the first base wall portion in a first direction, and a third case portion having a third base wall portion and a third core projection protruding from the third base wall portion in a third direction opposite to the first direction, comprising:
- a tape; and
- a tape core provided with a core hole into which the third core projection is inserted, and around which the tape is wound, wherein
- the tape core is provided with an insertion receiving section which is positioned on a radially outer side of the tape core with respect to the core hole and into which the first core projection is configured to be inserted, and
- when the first core projection is inserted into the insertion receiving section and the third core projection is inserted into the core hole, the first core projection is positioned on the radially outer side of the third core projection with respect to the core hole.

7. A tape cartridge set comprising:
- a plurality of tape rolls each including a tape and a tape core which is provided with a core hole and an annular recess portion positioned on a radially outer side of the tape roll with respect to the core hole and around which the tape is wound; and
- a cartridge case including a first case portion having a first base wall portion and a first core projection protruding from the first base wall portion in a first direction and inserted into the annular recess portion, and a third case portion having a third base wall portion and a third core projection protruding from the third base wall portion in a third direction opposite to the first direction and inserted into the core hole, and configured to accommodate one tape roll of the plurality of tape rolls,
- wherein, when the first core projection is inserted into the annular recess portion and the third core projection is inserted into the core hole, the first core projection is positioned on the radially outer side of the third core projection with respect to the core hole.

* * * * *